United States Patent
Shughrue

(10) Patent No.: US 12,353,398 B2
(45) Date of Patent: *Jul. 8, 2025

(54) AUTOMATICALLY ESTIMATING PLACE DATA ACCURACY

(71) Applicant: Snap Inc., Santa Monica, CA (US)

(72) Inventor: Christopher Shughrue, Canaan, NY (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/510,195

(22) Filed: Nov. 15, 2023

(65) Prior Publication Data

US 2024/0086396 A1    Mar. 14, 2024

Related U.S. Application Data

(63) Continuation of application No. 17/650,475, filed on Feb. 9, 2022, now Pat. No. 11,853,289.

(51) Int. Cl.
*G06F 16/00* (2019.01)
*G06F 16/23* (2019.01)
*G06F 16/29* (2019.01)

(52) U.S. Cl.
CPC ......... *G06F 16/2365* (2019.01); *G06F 16/29* (2019.01)

(58) Field of Classification Search
CPC .... G06F 18/214; G06F 18/217; G06F 16/212; G06F 16/2365; G06F 16/254;
(Continued)

(56) References Cited

U.S. PATENT DOCUMENTS 11,157,835 B1 * 10/2021 Hjermstad ............. G06N 5/025
11,301,722 B2 * 4/2022 Berry ..................... G06N 3/08
(Continued)

FOREIGN PATENT DOCUMENTS

EP          3828803 A1    6/2021
WO   WO-2024206460 A1   10/2024

OTHER PUBLICATIONS

"U.S. Appl. No. 17/650,475, Non Final Office Action mailed Apr. 20, 2023", 16 pgs.

(Continued)

*Primary Examiner* — Shyue Jiunn Hwa
(74) *Attorney, Agent, or Firm* — Schwegman Lundberg & Woessner, P.A.

(57) ABSTRACT

Aspects of the present disclosure involve a system comprising a computer-readable storage medium storing a program and a method for performing operations comprising: receiving a plurality of records associated with a first geographical area; identifying a plurality of corrections to a first attribute in the first geographical area in the plurality of records for a particular time period; based on identifying the plurality of corrections to the first attribute, computing a first metric representing a quantity of the plurality of corrections to the first attribute per effort during the particular time period; accumulating a first value representing a total number of errors across a plurality of time periods up to and including the particular time period based on the identified plurality of corrections; and generating a first model that predicts accuracy of the first attribute in the first geographical area based on the metric and the accumulated first value.

20 Claims, 10 Drawing Sheets

(58) Field of Classification Search
CPC .... G06F 16/29; G06F 16/337; G06F 18/2148; G06F 18/2185; G06F 18/24323; G06F 30/20; G06F 8/10; G06F 8/24; G06F 8/315; G06F 8/36; G06F 9/44521; G06F 9/542; G06N 20/00; G06N 3/044; G06N 3/08; G06Q 10/06316; G06Q 20/02; G06Q 20/04; G06Q 40/00

See application file for complete search history.

(56) References Cited

U.S. PATENT DOCUMENTS

| | | | | |
|---|---|---|---|---|
| 11,620,558 | B1* | 4/2023 | Xu | G06N 7/01 706/12 |
| 2020/0364507 | A1* | 11/2020 | Berry | G06F 18/217 |
| 2020/0380416 | A1* | 12/2020 | Zion | G06Q 30/0202 |
| 2023/0306015 | A1 | 9/2023 | Shughrue | |
| 2024/0331010 | A1 | 10/2024 | Shughrue et al. | |

OTHER PUBLICATIONS

"U.S. Appl. No. 17/650,475, Notice of Allowance mailed Aug. 17, 2023", 5 pgs.

"U.S. Appl. No. 17/650,475, Response filed Jul. 17, 2023 to Non Final Office Action mailed Apr. 20, 2023", 10 pgs.

"International Application Serial No. PCT/US2024/021702, International Search Report mailed May 24, 2024", 4 pgs.

"International Application Serial No. PCT/US2024/021702, Written Opinion mailed May 24, 2024", 5 pgs.

Cheng, Chen, et al., "A Unified Point-of-Interest Recommendation Framework in Location-Based Social Networks", ACM Transactions on Intelligent Systems and Technology, Association for Computing Machinery Corporation, 2 Penn Plaza, Suite 701 New York NY 10121-0701 USA, vol. 8, No. 1, (Sep. 20, 2016), 21 pgs.

Zhang, Jia-Dong, et al., "GeoSoCa Exploiting Geographical, Social and Categorical Correlations for Point-of-Interest Recommendations", Proceedings of the 38th International ACM SIGIR Conference on Research and Development in Information Retrieval, SIGIR '15, ACM Press, New York, New York, USA, (Aug. 9, 2015), 10 pgs.

U.S. Appl. No. 17/650,475, filed Feb. 9, 2022, Automatically Estimating Place Data Accuracy.

* cited by examiner

AUTOMATICALLY ESTIMATING PLACE DATA ACCURACY

CLAIM OF PRIORITY

This application is a continuation of U.S. patent application Ser. No. 17/650,475, filed Feb. 9, 2022, which is incorporated herein by reference in its entirety.

TECHNICAL FIELD

The present disclosure generally relates to the field of electronic records and data analysis, including user-provided content.

BACKGROUND

Maps and map-related applications include data about points of interest. Data about points of interest can be obtained from surveys or field reports submitted by users, in a practice known as crowdsourcing. Crowdsourcing involves a large, relatively open, and evolving pool of users who can participate and gather real-time data without special skills or training. Crowdsourced data is inherently arbitrary. Regions densely populated with active users may generate a relatively high number of field reports compared to regions with fewer users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
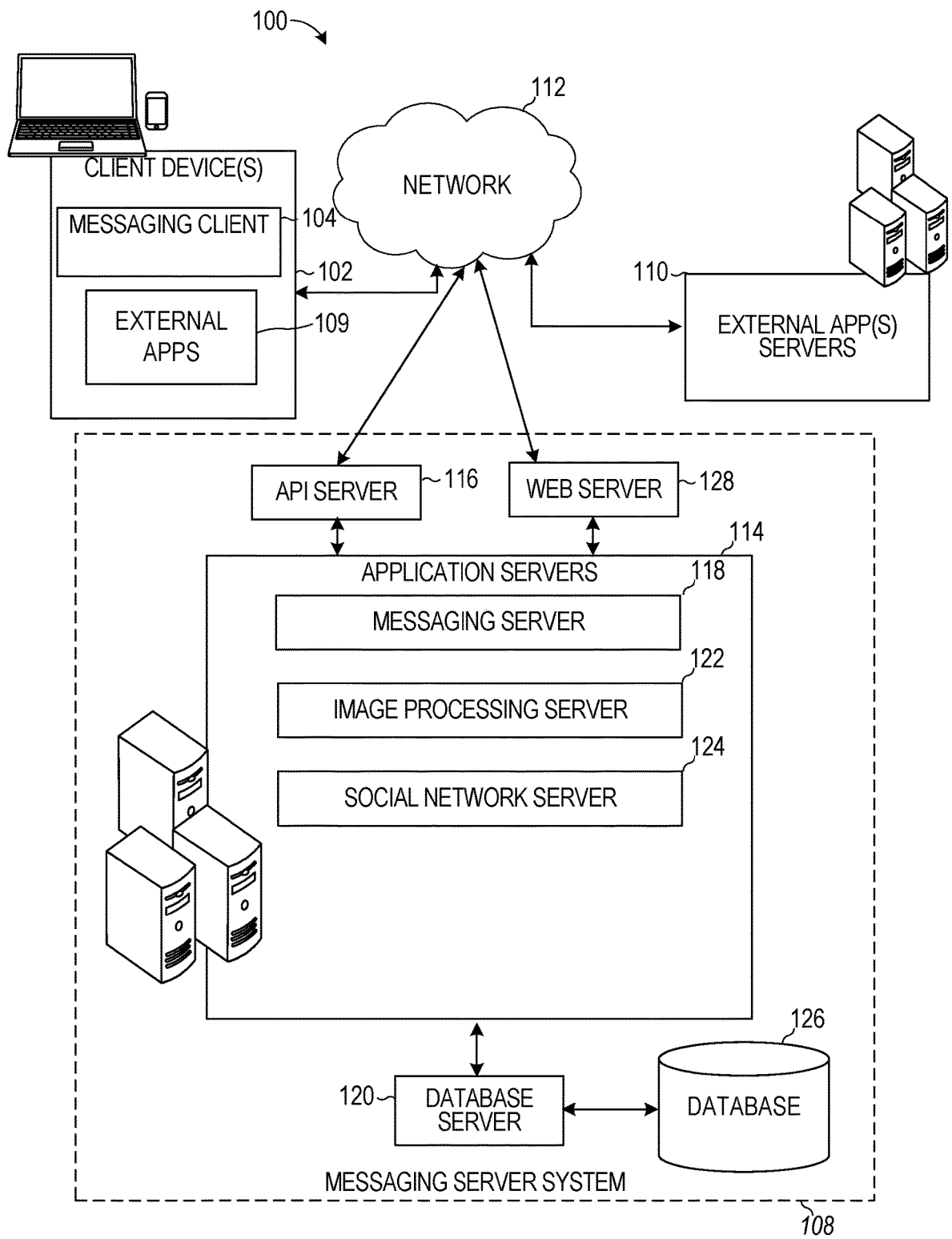
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typical systems allow users to access information about points of interest (POIs) that are in a particular geographical location or geo-space. Such information can include the POI name, a POI address, a POI phone number, a POI category, a POI postal code, a POI region, a POI locality, a POI geometry, a POI country, a POI opening hours, a POI ceased status, and/or a POI address. This information can be presented to a user in a graphical user interface while browsing, for example, a map related to a user's current location. In many cases, the information that is presented can include various errors, such as the wrong POI address or phone number. These errors can make the data unreliable and reduce interest in using the system which results in lack of use. The lack of use can result in missed opportunities and waste of resources. Also, users and participating businesses want place data that reflects the objective ground truth (e.g., place data that is accurate, reliable, and up to date). Ground truth place data can be sought by purchasing proprietary third-party datasets or by sending expert investigators into the field. Hiring expert content moderators to investigate takes time and adds expense.

The disclosed techniques improve the efficiency of using an electronic device by predicting the total number of errors of attributes of POIs or places in a region, based on crowdsourced field reports. For example, a depletion model (e.g., a linear regression model) is applied to a subset of field reports to calculate a catch rate based on a catch quantity compared to an effort quantity. The catch rate can represent the catch quantity (e.g., number of errors corrected in a given attribute for a particular geographical area in a given time interval) compared to the effort quantity (e.g., amount of activity or number of reports received during the given time interval). The total number of errors for the region is predicted based on the catch rate compared to a cumulative catch count. The process of applying the depletion model includes generating a linear function to predict the total number of errors quantity. The method further generates an estimated level of accuracy for the information (attributes of POIs) in the region, which can be used to establish a market value.

According to some examples, a plurality of records (field reports) associated with a first geographical area are collected. The plurality of field reports are processed to identify a plurality of corrections to a first attribute in the first geographical area in the plurality of records for a particular time period. Based on identifying the plurality of corrections to the first attribute, a first metric is computed representing a quantity of the plurality of corrections to the first attribute per effort during the particular time period. The disclosed examples accumulate a first value representing a total number of errors across a plurality of time periods up to and including the particular time period based on the identified plurality of corrections. The disclosed examples generate a first model that predicts accuracy of the first attribute in the first geographical area based on the metric and the accumulated first value. In some examples, multiple models can be generated for each respective attribute in each of a plurality of geographical areas. For example, a second model can be similarly generated to predict accuracy of the first attribute in a second geographical area and a third model can be similarly generated to predict accuracy of a second attribute in the first geographical area.

As such, providing access to a system that has fewer errors or providing additional data indicating the level of accuracy of the information presented about POIs in a particular area can improve confidence in the overall system. This can reduce the waste of resources and improve the accuracy of the data presented. This improves the overall experience of the user in using the electronic device and reduces the overall amount of system resources needed to accomplish a task.

In some examples, a map-related mobile application can be accessed by one or more users. The one or more users may submit a field report about an existing place or POI (e.g., an Edit action type). The format of a field report can includes place or POI data that is limited to a predefined set of attributes, some of which are expected to be relatively static over time (e.g., name, address, business type, telephone number) while others are subject to change or dynamic (e.g., admission policies, hours of operation, amenities). A field report submitted by a user, for example, includes a data submission or label (e.g., cafe) associated with a particular attribute (e.g., business type). The field report need not include a label for each and every attribute. For example, an Edit action may include a single label associated with one attribute of a place.

In some examples, the map-related mobile application presents various information about POIs or places in a particular geographical area. The map-related mobile application can receive input from the user that specifies a correction to an attribute of a given POI listed in the map-related mobile application graphical user interface. The input can, for example, specify a correction to the operating hours. The map-related mobile application generates a field report that includes the coordinates or other identifier of the particular geographical area, a timestamp, and an identifier of the attribute that has been corrected or specified by the user as having an error. This field report can be aggregated with other field reports submitted by other users related to the same particular geographical area and the same attribute (but different POI or the same POI) or different attributes (of the same or different POI). The collection of field reports can be processed to generate values representing a quantity of errors identified/corrected for a particular attribute in the particular geographical area during a given time interval. After collecting multiple field reports for the same attribute and the same geographical area for multiple time intervals, a model can be generated that predicts accuracy of the attribute in the geographical area. Namely, the model can predict the total number of errors expected to be identified/corrected in the geographical area for the attribute. The model can be used to determine accuracy of the attribute by computing a ratio of the accumulated number of errors identified/corrected up to a particular time interval (the current time) and the predicted total number of errors. Once various attributes or a set of attributes associated with certain weights are determined to have a level of accuracy that is greater than a threshold, the system can assign a high level of confidence to the geographical area and can present an indicator of the high level of confidence in the map-related application to inform users about the quality and integrity of the information presented for the particular geographical area.

Networked Computing Environment

FIG. 1 is a diagrammatic representation of a networked environment of a messaging system 100 in which the present disclosure may be deployed, in accordance with some examples. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally-hosted third-party applications (also referred to as "external applications" and "external apps") 109 using Application Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data). In some examples, the messaging client 104 can generate and submit (send) one or more field reports to the messaging server system 108 (or any other suitable server or entity) for one or more attributes in a one or more geographical areas. Each of the field reports can include a user identifier, a place (POI) identifier, a submission timestamp, and an action type. In some implementations, the action types can include an Edit action type (e.g., submitting a field report including one or more suggested edits, changes, corrections, or other data about one or more place attributes associated with a place that was previously added), as well as other action types.

The user identifier in the field report in some implementations includes a username, a device identifier (e.g., a device IP address, device metadata, or other identifier of the client device 102), geolocation data associated with the client device 102 (e.g., image metadata in EXIF format), and other indicia associated with a particular person who is a participating or registered user. The submission timestamp in the field reports in some implementations represents the date and clock time when a field report is submitted or generated by a messaging client 104. The place identifier in the field report in some implementations includes a place name, a unique place number (e.g., a reference or serial number), a geospatial identifier (e.g., geographic metadata, GPS data), and other indicia associated with the geographic place where a field report was submitted.

Each field report can in some implementations include one or more user-submitted labels, including one or more characters (e.g., letters, words, digits, blank spaces, punctuation), a value (e.g., a selection from a menu, a value associated with a particular variable), or any other indicia associated with or representing a place attribute. A place attribute in some implementations includes any of a variety of attributes associated with a place or point of interest, including attributes that are expected to remain relatively static over time (e.g., name, address, business type, telephone number) and other attributes that are relatively dynamic, variable, or subject to change over time (e.g., admission policies, hours of operation, amenities). For example, a user-submitted label that includes the text string "Acme Bank" may be submitted to represent the place attribute entitled "Business Name." Another example user-submitted label that includes the numerical value may be submitted to represent the place attribute entitled "Open Hours on Mondays."

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (Us) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118. In some examples, any or all of the operations discussed as being performed by the image processing server 122 can be similarly (or alternatively) performed locally by the client device 102.

Figure 2:
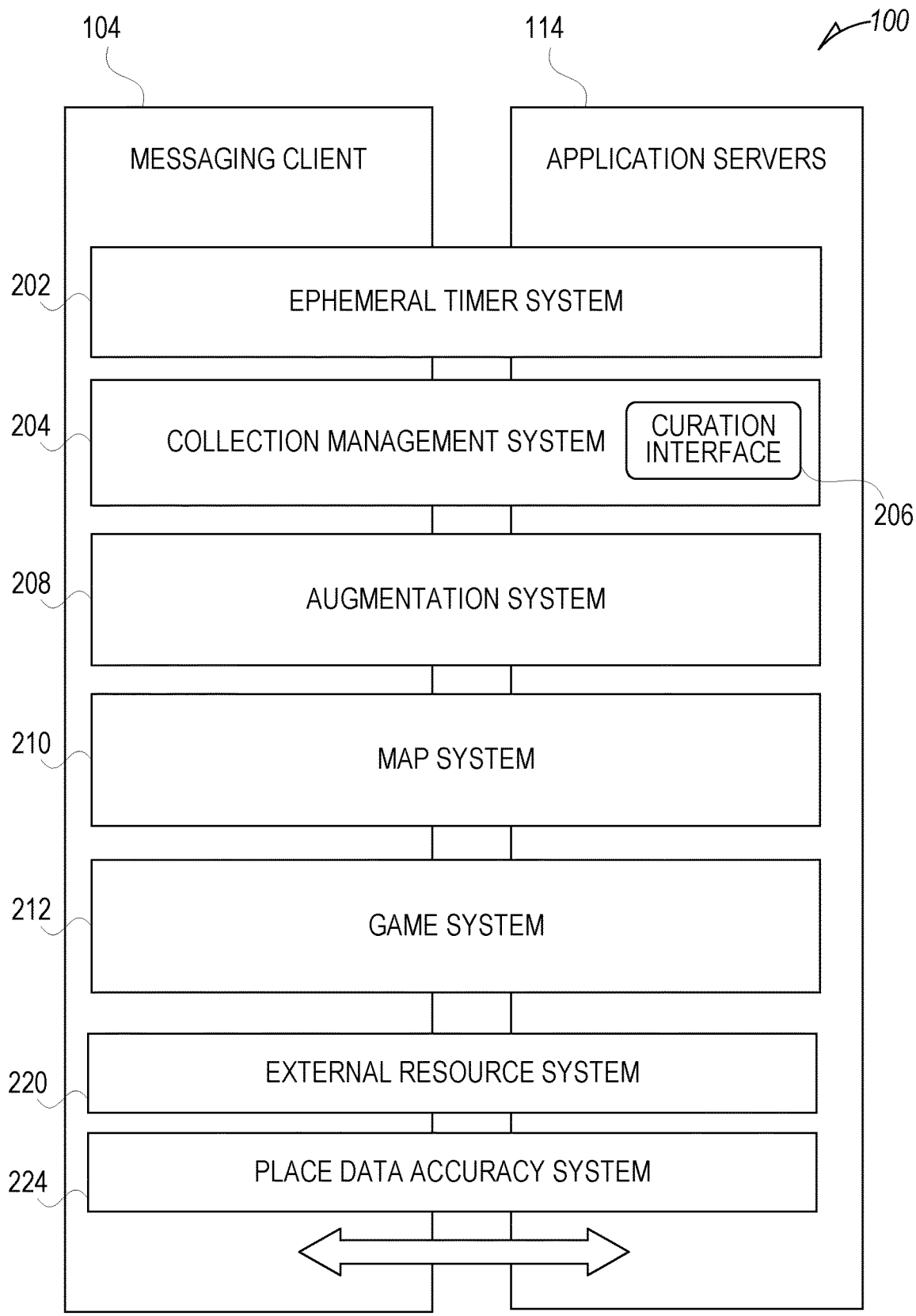
FIG. 2 is a block diagram illustrating further details regarding the messaging system, according to some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification.

Figure 3:
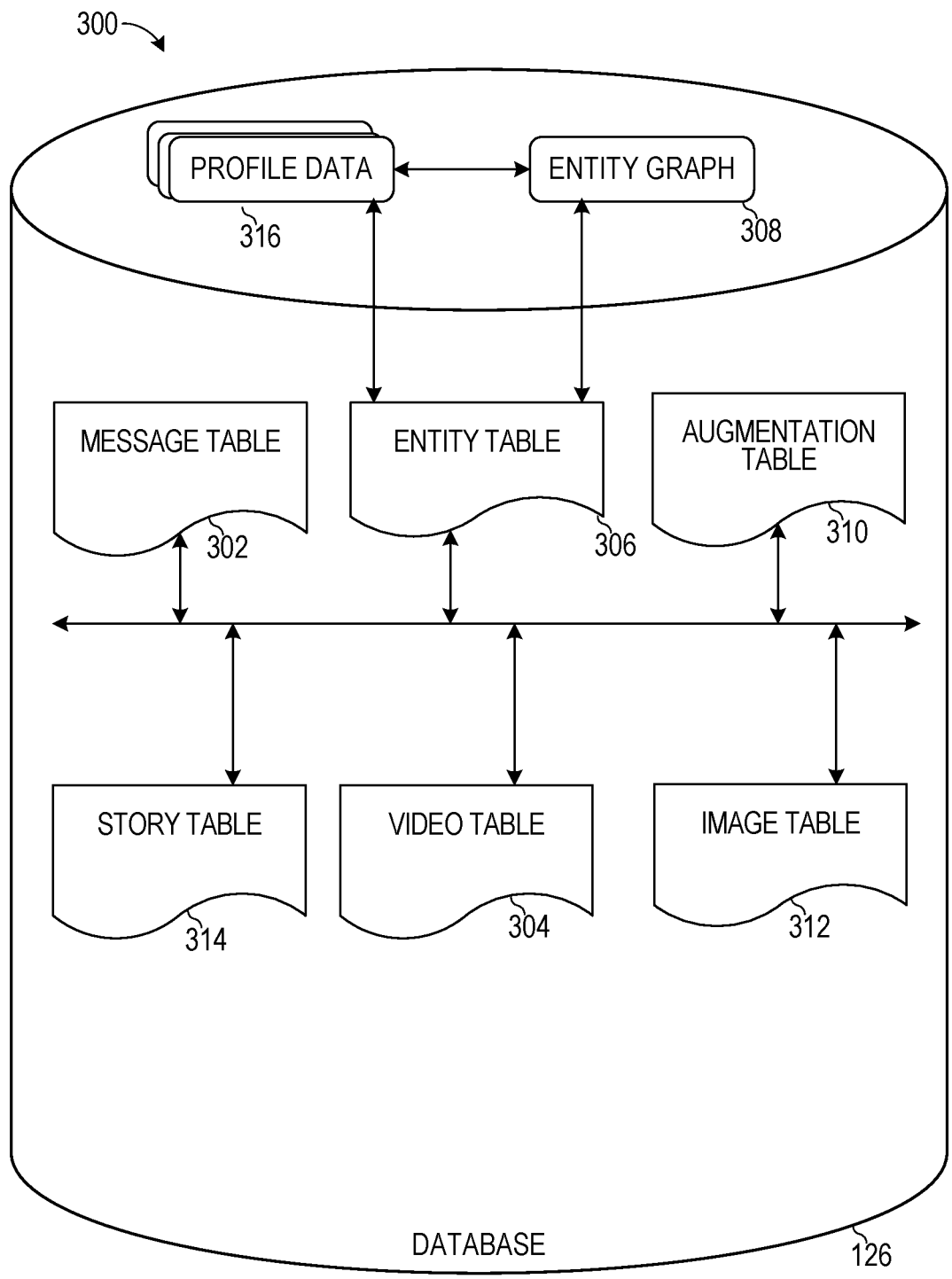
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In some examples, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 220, and a place data accuracy system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synchronize up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In some examples, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In some examples, the place data accuracy system 224 receives one or more field reports from various client devices 102. The place data accuracy system 224 processes the field reports to identify errors or corrections to errors of attributes associated with a particular geographical area (region or location). The place data accuracy system 224 can separate the field reports according to their respective timestamps to collect field reports that correspond to different time intervals. Within each time interval, the place data accuracy system 224 computes the number of field reports that include an identification of an error or correction to an error in a particular attribute. The place data accuracy system 224 computes the catch rate as a function of the computed number of field reports that include the identification of the error in the same attribute and a total effort (total number of reports generated for the particular time interval). The place data accuracy system 224 also accumulates the total number of errors identified or corrected for each time interval and generates a depletion model. The depletion model can be generated by applying linear regression to a set of points corresponding to different catch rates at different time intervals relative to accumulated number of errors associated with each time interval. The depletion model can be used to predict the total number of errors expected to be found or corrected for a particular attribute in a particular geographical area. An illustrative implementation of the place data accuracy system 224 is shown and described in connection with FIG. 5 below.

In some examples, this predicted total number of errors can be used to establish a measure of accuracy in the information associated with the particular geographical area. In some implementations, a first level of accuracy can be computed for a first attribute in the geographical area by dividing a current total number of errors identified or corrected up to the current time by the predicted total number of errors expected to be identified for the second attribute. In some implementations, a second level of accuracy can be computed for a second attribute in the same geographical area by dividing a current total number of errors identified or corrected up to the current time by the predicted total number of errors expected to be identified for the second attribute. When the place data accuracy system 224 determines that both the first and second levels of accuracy reach a threshold value (e.g., 90%), the place data accuracy system 224 can generate an indicator that specifies that the information in the particular geographical area has reached a suitable level of accuracy and is reliable. This indicator can be presented to end users who are browsing content or information in the particular geographical area.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in some examples, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can store a collection of field reports (or records) associated with one or more geographical areas. The field reports (or records) can be associated with different time intervals in the data structures 300 according to various periodic time increments (e.g., weekly or daily) based on the timestamps stored in each field report. The periodic time increment, in some implementations, is repeating and regular (e.g., the same increment for all the records in the data structures 300). A regular or consistent periodic time increment, in some implementations, is best suited to the depletion models described herein. For example, a linear regression model can be generated using a series of records established according to a regular periodic time increment.

Data Communications Architecture

Figure 4:
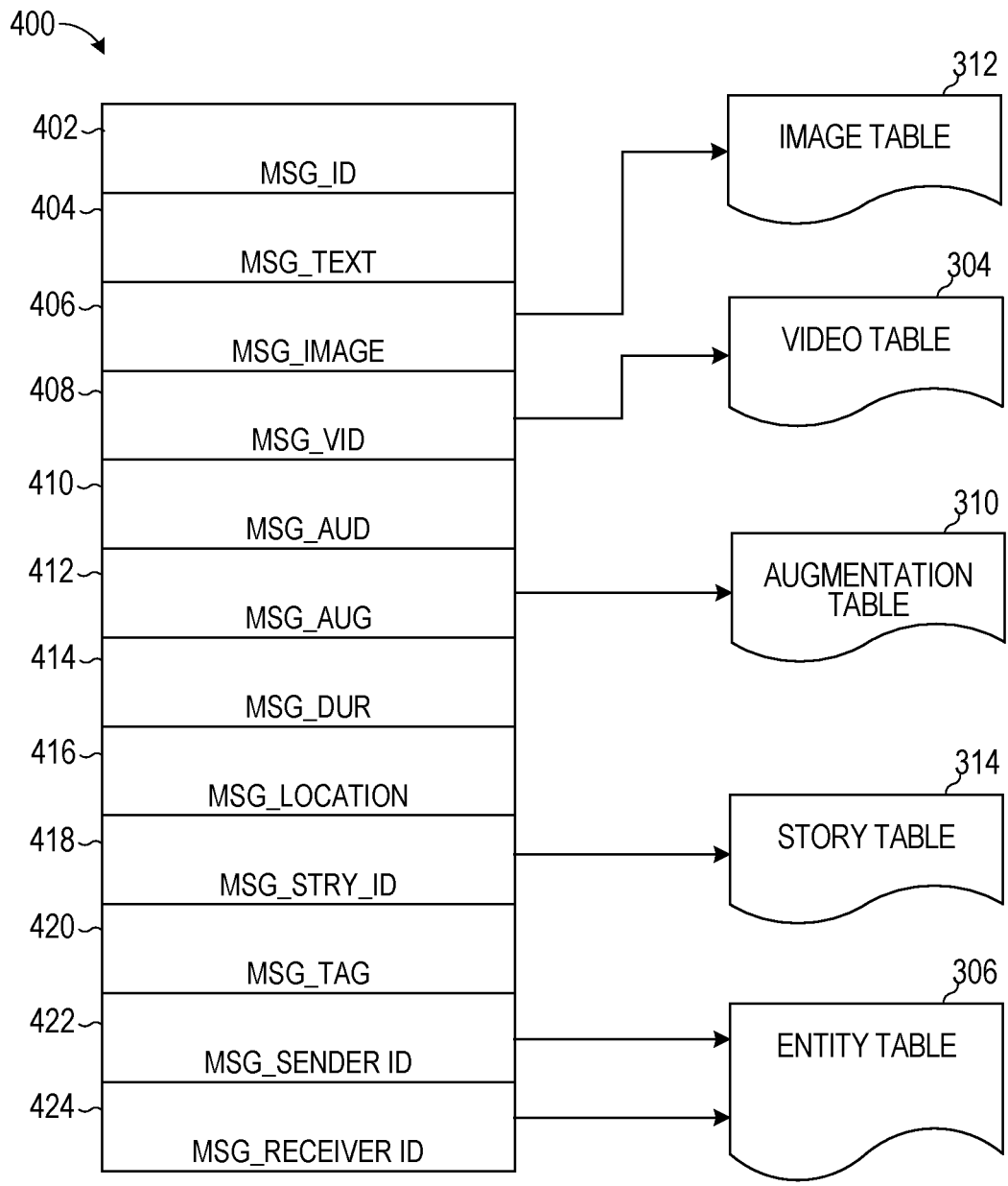
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Place Data Accuracy System

Figure 5:
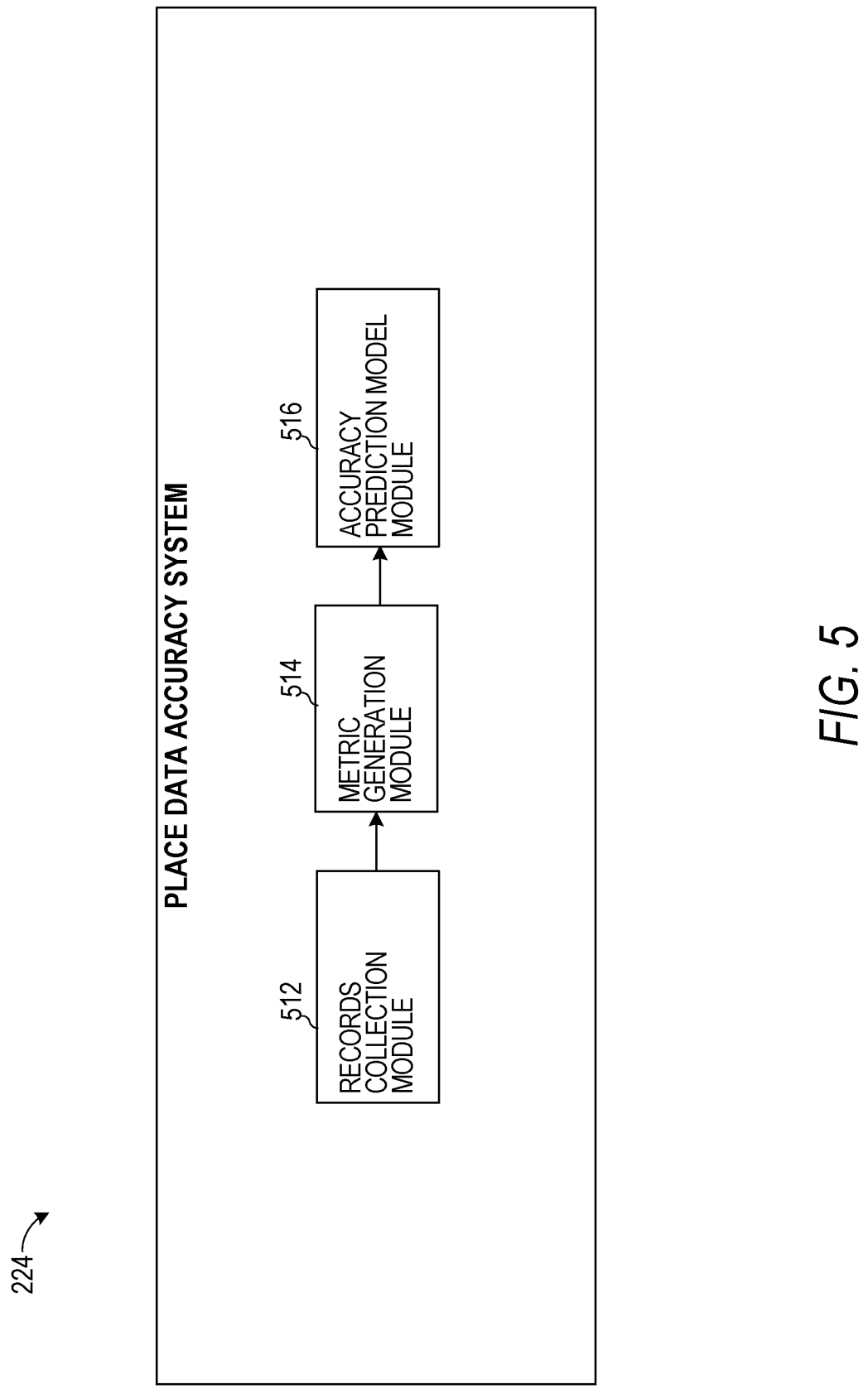
FIG. 5 is a block diagram showing an example place data accuracy system, according to some examples.

FIG. 5 is a block diagram showing an example place data accuracy system 224, according to some examples. The place data accuracy system 224 includes a set of components that operate on a set of input data (e.g., one or more field reports or records) associated with one or more geographical areas. The place data accuracy system 224 includes a records collection module 512, a metric generation module 514, and an accuracy prediction model module 516. All or some of the components of the place data accuracy system 224 can be implemented by a server. In some cases, some or all of the components of the place data accuracy system 224 can be implemented by the client device 102.

The records collection module 512 communicates with one or more client devices 102 to obtain one or more field reports or records associated with various geographical areas or regions. The records collection module 512 obtains the timestamps from each field report and identifies a time interval into which the timestamps fall. For example, the records collection module 512 can generate various time intervals each with a starting time and ending time. The records collection module 512 can associate a given field report with a particular time interval in response to determining that the timestamp in the field report is within the starting time and ending time of the particular time interval.

The records collection module 512 can also obtain place or POI identifiers of each field report. The records collection module 512 can identify a plurality of geographical areas, each of which spans a different set of GPS coordinates. The records collection module 512 can associate a first field report with a first geographical area in response to determining that the place or POI identifier or GPS coordinates of the first field report fall within the GPS coordinates of the first geographical area. In similar ways, the records collection module 512 can associate each of the field reports or records received from the client devices 102 with particular geographical areas and time intervals.

In some examples, the records collection module 512 can generate a plot for a particular attribute of places or POIs in a first geographical area. The plot can map a catch rate for the particular attribute against the accumulated number of errors corrected/identified. For example, the records collection module 512 can search the field reports for a first set of field reports associated with a first time interval and the first geographical area. The records collection module 512 can identify within the first set of field reports records or field reports with an Edit or Update field for the particular attribute. The Edit or Update field can include an indication of an error and/or a correction of the error in the attribute. For example, the records collection module 512 can identify a first record that indicates an error in the opening hours of a first POI in the first geographical area and a second record that indicates an error in the opening hours of a second POI in the first geographical area. The first and second records can include timestamps that fall within the first time interval.

The records collection module 512 can count how many of the first set of field reports include an Edit or Update field for the same attribute within the first time interval to accumulate a first value. The records collection module 512 can then compute how many total records were received during the first time interval in the first geographical area. The records collection module 512 can divide the first value by the total number of records received to determine the first catch rate for the first time interval. The records collection module 512 can also accumulate a value represent the total number of errors identified up to the first time interval. Namely, the value can represent how many errors were identified in received field reports from the first time interval and all of the time intervals that precede the first time interval. The records collection module 512 can then plot the first catch rate against the accumulated total value.

The records collection module 512 can then search the field reports for a second set of field reports associated with a second time interval and the first geographical area. The records collection module 512 can identify within the second set of field reports records or field reports with an Edit or Update field for the particular attribute. The Edit or Update field can include an indication of an error and/or a correction of the error in the attribute. The records collection module 512 can count how many of the second set of field reports include an Edit or Update field for the same attribute within the second time interval to accumulate a second value. The records collection module 512 can then compute how many total records were received during the second time interval in the first geographical area. The records collection module 512 can divide the second value by the total number of records received to determine the second catch rate for the second time interval. The records collection module 512 can also accumulate the total number of errors identified up to the second time interval. Namely, the value can represent how many errors were identified in received field reports from the second time interval and all of the time intervals that precede the second time interval including the first time interval. The records collection module 512 can then plot the second catch rate against the accumulated total value based on the second time interval.

In some examples, the records collection module 512 provides the first and second sets of field reports to the metric generation module 514 to determine the first and second catch rates. Namely, the metric generation module 514 can generate a metric that represents the total number of errors corrected/identified in a particular geographical area relative to the effort in a given time interval. This metric can then be plotted against a running or accumulated number of errors to generate a prediction model for the accuracy of the attribute in the particular geographical area.

Figure 6:
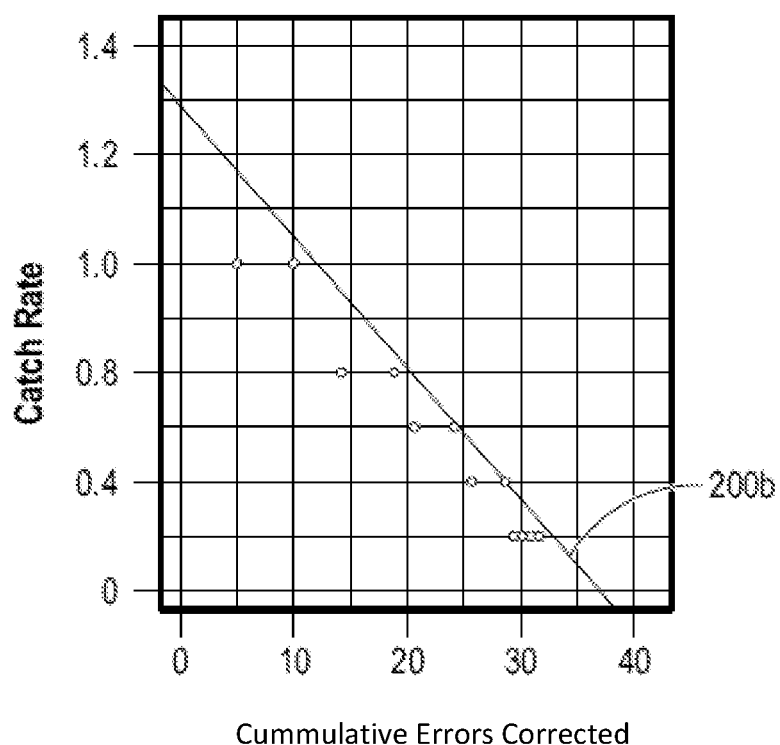
FIGS. 6 and 7 are diagrammatic representations of outputs of the place data accuracy system, in accordance with some examples.

For example, the metric generation module 514 can receive the first and second catch rates and generate a plot 600, shown in FIG. 6. The plot 600 can represent catch rates for a given attribute in a particular geographical area. The plot 600 includes multiple points of various catch rates at different points in time along the y-axis and the accumulated number of errors identified/corrected along the x-axis. A line 200b can be generated as a best fit or by linear regression based on the plotted points. The plot 600 is a Cartesian coordinate system showing each data point as a hollow dot, in which the abscissa value along the x-axis is the cumulative catch count and the ordinate value along the y-axis is the calculated catch rate.

The accuracy prediction model module 516 applies a curve fitting process to generate a model for the accuracy of the attribute in the particular geographical area. The model can be used to estimate or predict the total number of errors in an attribute in a particular geographical area.

The data points show that the calculated catch rate is trending toward zero as the cumulative catch count (the number of errors identified/corrected) increases. Curve fitting describes the process of constructing a curve or finding a mathematical function that best fits a series of known data points. In statistics, a linear function fits a line to the known data points. The resulting linear function has the form $y=mx+b$, where m is the slope of the line and b is the y-intercept value (i.e., the value of y when the line crosses (intersects) the y-axis (for x equals zero)). For a given linear function, the x-intercept value (i.e., the value of x when the line crosses the x-axis) can be calculated by setting y equal to zero and solving for x.

The accuracy prediction model can be used to predict a total number of errors for a given attribute in a given geographical area and includes applying a depletion model. The depletion model in some implementations is a linear regression model which, when applied to the established series of records generates a linear function that is based on the calculated catch rate and the maintained cumulative catch count. The depletion model in some implementations is applied as part of a system for predicting the total number of errors identified/corrected associated with a geographical region, estimating accuracy of the attribute, and establishing a market value associated with the region.

Figure 7:
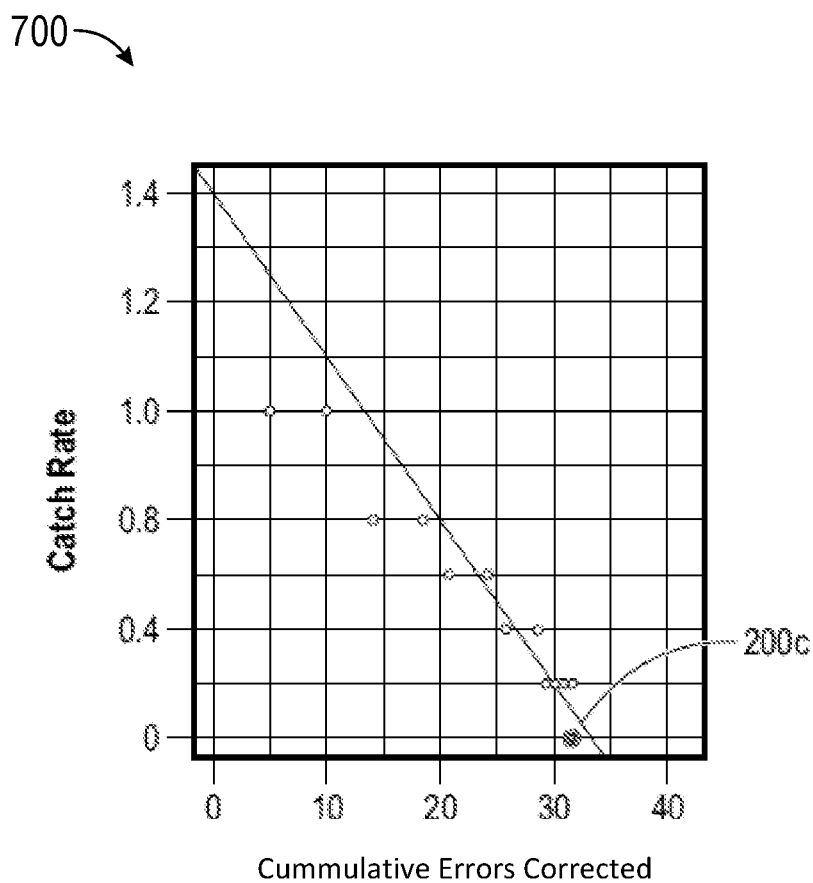

As an example, as shown in FIG. 7, plot 700 shows the point 200c that represents the predicted number of errors identified/corrected. The point 200c corresponds to the prediction based on the linear function of when the plotted line will cross the x-axis. At that point, the total catch rate is '0'. Namely, the prediction provided by the model represents how many errors need to be identified/corrected for the catch rate to be 0 (e.g., no more errors are identified/corrected in the field reports).

The accuracy prediction model module 516 can generate different models or prediction models for different attributes in each geographical area. For example, the accuracy prediction model module 516 can generate a first model that represents the accuracy of a first attribute in a first geographical area. The accuracy can be generated as a function of the current accumulated number of errors up to a current time interval relative to the predicted number of errors for the first geographical area for the first attribute. The accuracy prediction model module 516 can generate a second model that represents the accuracy of a second attribute in a first geographical area. The accuracy can be generated as a function of the current accumulated number of errors up to a current time interval relative to the predicted number of errors for the first geographical area for the second attribute.

The accuracy prediction model module 516 can compare the accuracy of the first and second attributes to a threshold (e.g., 96%). In response to determining that the accuracies of both attributes exceed the threshold, the accuracy prediction model module 516 can stop collecting field reports for the first geographical area and can generate a notification, alert or indicator in a map for the first geographical area indicating that the accuracy of information presented for the first geographical area exceeds a threshold.

In some examples, the accuracy prediction model module 516 can generate a third model that represents the accuracy of the first attribute in a second geographical area. The accuracy can be generated as a function of the current accumulated number of errors up to a current time interval relative to the predicted number of errors for the second geographical area for the first attribute. The accuracy prediction model module 516 can generate a fourth model that represents the accuracy of a second attribute in a second geographical area. The accuracy can be generated as a function of the current accumulated number of errors up to a current time interval relative to the predicted number of errors for the second geographical area for the second attribute. The accuracy prediction model module 516 can compare the accuracy of the first and second attributes in the second geographical area to a threshold (e.g., 96%). In response to determining that the accuracies of both attributes exceed the threshold, the accuracy prediction model module 516 can stop collecting field reports for the second geographical area and can generate a notification, alert or indicator in a map for the first geographical area indicating that the accuracy of information presented for the first geographical area exceeds a threshold.

In some cases, the accuracy prediction model module 516 can retrieve the accuracies of a given attribute (e.g., the first attribute) across a set of geographical areas. The accuracy prediction model module 516 can determine how the accuracies of the given attribute change over time or can determine when the accuracies of the same attribute across a plurality of geographical areas exceeds a threshold. In response to determining that the accuracy of the given attribute across multiple geographical areas exceeds the threshold, the accuracy prediction model module 516 can generate an indicator that the information collected for the multiple geographical areas is accurate. This indicator can be used to raise advertising costs or to incentive content providers to generate content. In some cases, the rates for advertising in a particular geographical area can be set and can change as a function of accuracy (e.g., in proportion to the level of accuracy of one or more attributes). The rates for advertising or the cost for the advertising in a particular geographical area can be increased when a first set of attributes associated with a first weight reach a certain threshold level of accuracy. The rates can be increased at a lower pace or can remain unchanged in the particular geographical area when a second set of attributes associated with a second weight (lower than the first weight) reach a certain threshold level of accuracy.

In some examples, the place data accuracy system 224 can access a set of records (field reports) associated with a given attribute (e.g., addresses of one or more POIs in a given geographical area or region. The place data accuracy system 224 can determine that the set of records include a first number (e.g., 500) records associated with a first time interval (e.g., week 1). In the set of records, the place data accuracy system 224 can determine that a second number of records (e.g., 400) include an Edit field (or specify that there exists an error in an address attribute for one or more POIs in the geographical area, a first record can specify a wrong address for a first POI and a second record can specify a wrong address for a second POI). The place data accuracy system 224 can generate a metric (catch rate) for the given attribute for the first time interval by dividing the second number by the first number (e.g., 400/500). The place data accuracy system 224 can also accumulate the total number of errors by adding the second number to the previous running total (e.g., 0) to compute the accumulated number of errors as a value of 400. The place data accuracy system 224 can then plot a first point at an x-axis value of 400 and a y-axis value of 400/500.

Next, the place data accuracy system 224 can determine that a second set of records include a first number (e.g., 450) records associated with a first time interval (e.g., week 2). In the second set of records, the place data accuracy system 224 can determine that a second number of records (e.g., 375) include an Edit field (or specify that there exists an error in an address attribute for one or more POIs in the geographical area). The place data accuracy system 224 can generate a new metric (catch rate) for the given attribute for the second time interval by dividing the second number by the first number (e.g., 375/450). The place data accuracy system 224 can also accumulate the total number of errors by adding the second number to the previous running total (e.g., 400) to compute the accumulated number of errors as a value of 775 (e.g., 400+375). The place data accuracy system 224 can then plot a second point at an x-axis value of 775 and a y-axis value of 375/450.

The place data accuracy system 224 can continue collecting records and plotting points until a certain threshold number of records are processed. At that time, the place data accuracy system 224 can perform linear regression through the points to generate a model that represents or predicts a number of errors in the given attribute for the geographical area. For example, when the current time is week 2, the place data accuracy system 224 can apply the model to predict the total number of errors that will be accumulated at week 5 or at a time point when the line that fits through the plotted points intersects or crosses over the x-axis. Namely, the model can specify that the total number of errors in the given attribute for the geographical area is predicted to be 4500. In this way, the accuracy can be predicted at week 2 of the data as a function of the current accumulated total number of errors (e.g., 775) and the predicted number of errors (e.g., 4500), by dividing 775 by 4500. As the accumulated total number of errors approaches the predicted number of errors, the accuracy is increased.

In some examples, the accuracy prediction model module 516 implements one or more machine learning techniques or models, such as one or more artificial neural networks (ANN). The machine learning techniques are trained using training data to generate one or more predictions relating to the accuracy or number of errors expected for a given attribute. Each machine learning technique can be trained to generate a prediction for a different attribute in a new geographical area. Namely, the machine learning techniques can be trained to establish a relationship between a metric (representing a ratio of a number or quantity of errors to amount of effort during a time interval for a given attribute) and a plurality of training number of errors for the given attribute across a plurality of geographical areas. The machine learning techniques can then receive a new metric (representing a ratio of a number or quantity of errors to amount of effort during a time interval for the given attribute) in a new geographical area and can predict the number of errors in the new geographical area that are expected. In this way, less data or field records are needed to be collected to predict the total number of errors as the machine learning technique can generate the prediction about the total number of errors with fewer data points.

In some examples, to train the accuracy prediction model module 516, a plurality of training data can be received. The training data can include a plurality of metrics (ratios of number of errors identified to amount of effort) for a particular attribute across multiple geographical areas and the corresponding total number of errors predicted for each of the geographical areas as the ground-truth total number of errors. The accuracy prediction model module 516 (e.g., the neural network or machine learning technique) is applied to a first set of the training data corresponding to a first geographical area or first collection of geographical areas. Namely, the accuracy prediction model module 516 (e.g., the neural network or machine learning technique) is applied to a first collection of the metrics for the first collection of geographical areas to generate a prediction or estimation of the total number of errors expected for the particular attribute in the first collection of geographical areas. A deviation is computed between the predicted or estimated total number of errors and the ground truth number of errors (e.g., determined by applying the linear regression model to the first collection of the metrics). Parameters of the accuracy prediction model module 516 (e.g., the neural network or machine learning technique) are updated based in the deviation. The accuracy prediction model module 516 is then applied to a second collection of the metrics for a second collection of geographical areas. This process is repeated for all of the training data or until the deviation between the predicted or estimated total number of errors and the ground truth number of errors is within a certain threshold. Once trained, the machine learning techniques can then receive a new metric (representing a ratio of a number or quantity of errors to amount of effort during a time interval for the given attribute) in a new geographical area and can predict the number of errors in the new geographical area that are expected.

Figure 8:
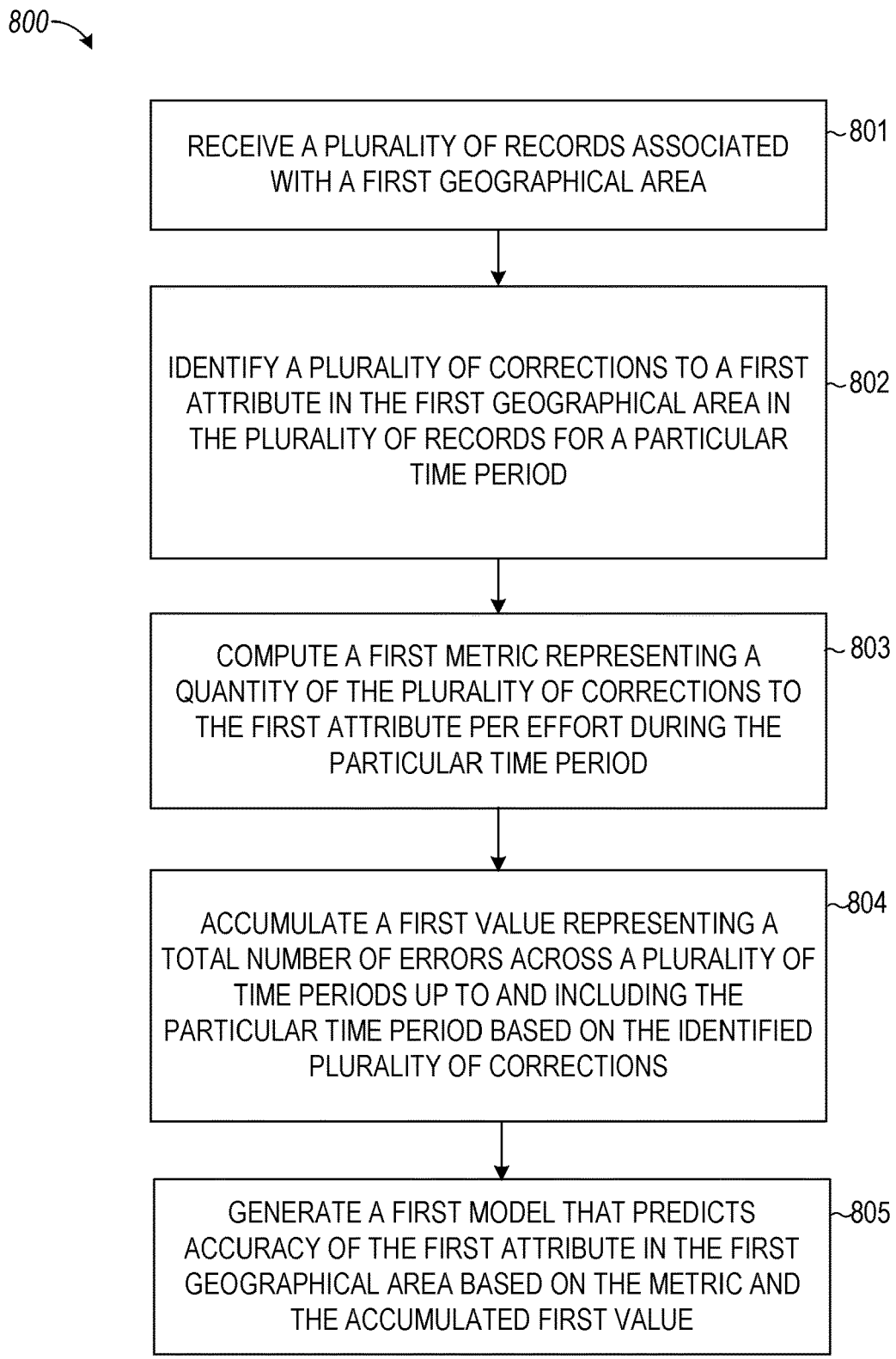
FIG. 8 is a flowchart illustrating example operations of the place data accuracy system, according to examples.

FIG. 8 is a flowchart of a process 800, in accordance with some examples. Although the flowchart can describe the operations as a sequential process, many of the operations can be performed in parallel or concurrently. In addition, the order of the operations may be rearranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, a server receives a plurality of records associated with a first geographical area, as discussed above.

At operation 802, the server identifies a plurality of corrections to a first attribute in the first geographical area in the plurality of records for a particular time period, as discussed above. Each of the plurality of corrections can be identifiers of errors in an attribute, a suggestion for a correction to the error, and/or a corrected value for the attribute.

At operation 803, the server based on identifying the plurality of corrections to the first attribute, computes a first metric representing a quantity of the plurality of corrections to the first attribute per effort during the particular time period, as discussed above.

At operation 804, the server accumulates a first value representing a total number of errors across a plurality of time periods up to and including the particular time period based on the identified plurality of corrections, as discussed above.

At operation 805, the server generates a first model that predicts accuracy of the first attribute in the first geographical area based on the metric and the accumulated first value, as discussed above.

Machine Architecture

Figure 9:
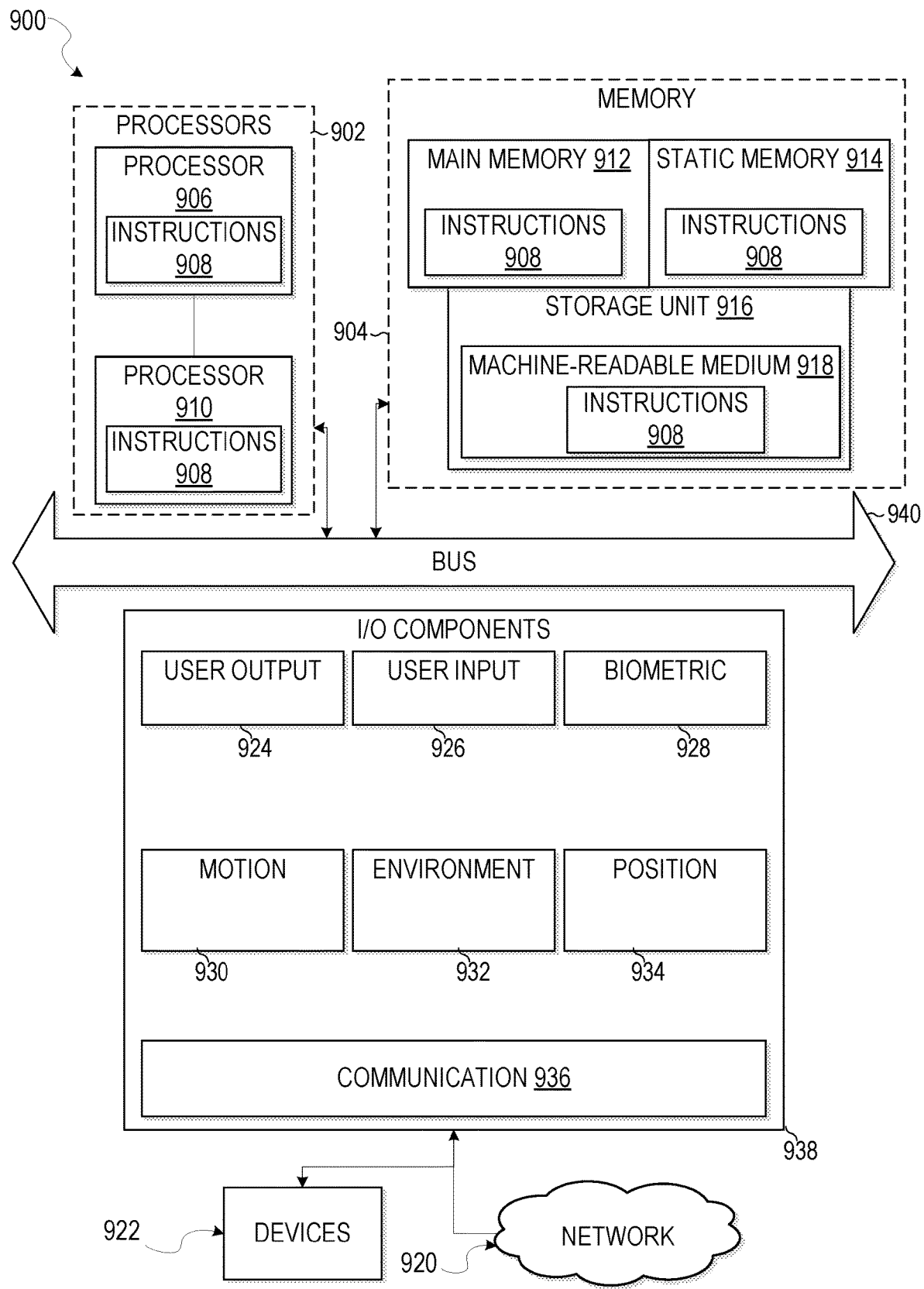
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
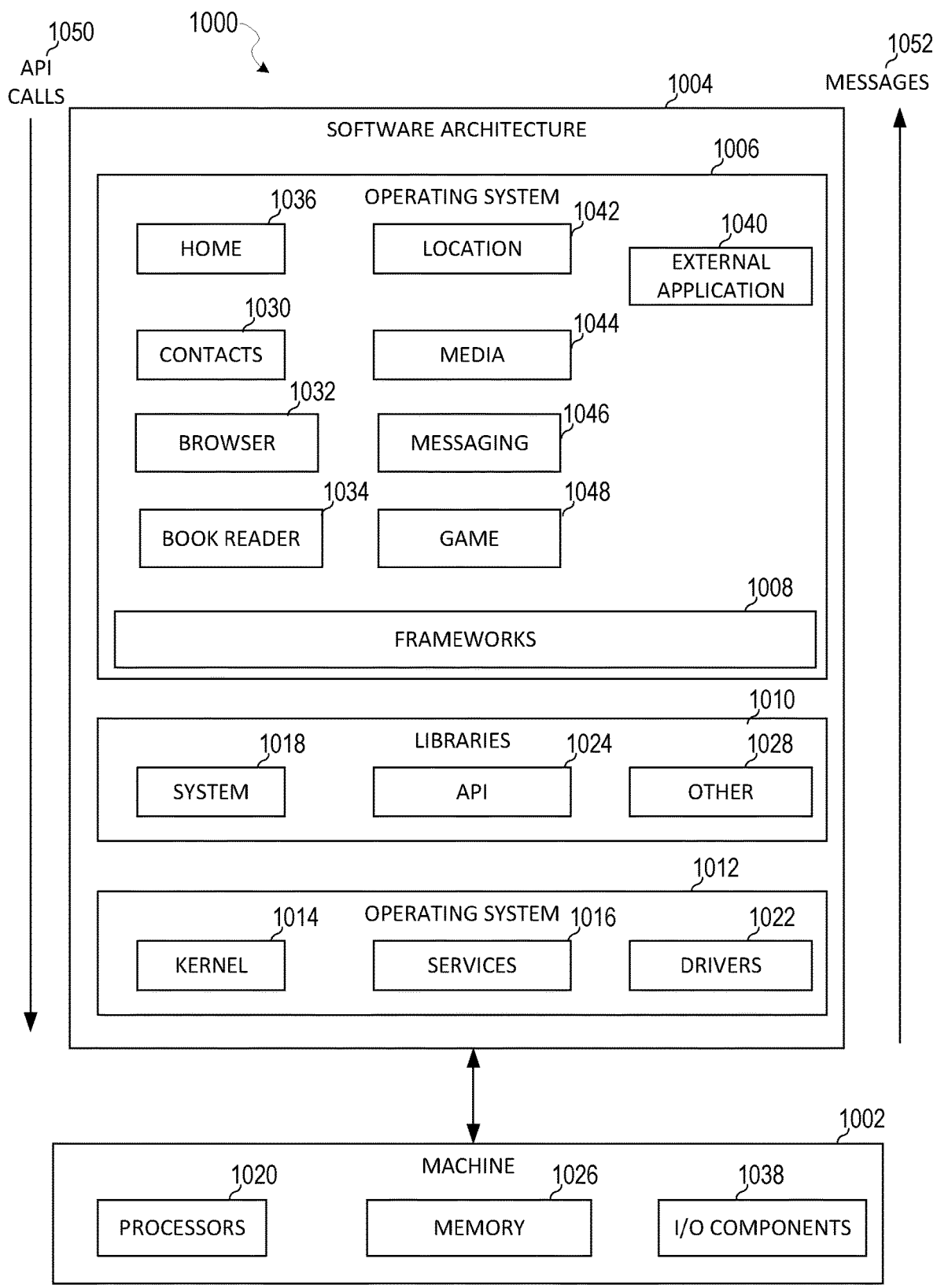
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
identifying a plurality of corrections to a first attribute in the first geographical area in a plurality of records for a particular time period;
based on identifying the plurality of corrections to the first attribute, generating information indicating a quantity of the plurality of corrections to the first attribute;
generating a first model that predicts accuracy of the first attribute in a first geographical area based on the generated information; and
in response to the first model determining that the first geographical area is associated with a threshold level of accuracy, presenting a visual indicator of a specified level of confidence in the first geographical area by a map-related application.

2. The method of claim 1, further comprising:
informing one or more users about a quality of information presented for the first geographical area by the map-related application.

3. The method of claim 1, further comprising:
accumulating a value based on the plurality of records; and
dividing a quantity of a plurality of corrections by the value to compute a first metric.

4. The method of claim 3, further comprising:
identifying a second metric representing a second quantity of corrections to the first attribute during a second time period; and
accumulating a second value representing a total number of errors across another plurality of time periods up to and including the second time period.

5. The method of claim 4, further comprising:
linearly regressing the first metric, the value, the second metric and the second value to generate the first model.

6. The method of claim 1, further comprising:
presenting, on a map-related mobile application of a first user, information about a point of interest (POI) in the first geographical area;
receiving input from the first user specifying a correction to an error in an individual attribute of the POI in the first geographical area; and
generating a first field report that includes coordinates of the first geographical area, a timestamp, and an identifier of the individual attribute specified by the first user has having the error in the individual attribute.

7. The method of claim 6, the input specifying a correction to operating hours of an establishment comprising the POI.

8. The method of claim 1, further comprising:
identifying a second plurality of corrections to a second attribute in the first geographical area in the plurality of records for the particular time period;
based on identifying the second plurality of corrections to the second attribute, computing a second metric representing a quantity of the plurality of corrections to the second attribute during the particular time period;
accumulating a second value representing a total number of errors in the second attribute across a plurality of time periods up to and including the particular time period based on the identified second plurality of corrections; and
generating a second model that predicts accuracy of the second attribute in the first geographical area based on the second metric and the accumulated second value.

9. The method of claim 8, further comprising computing a measure of accuracy of a plurality of attributes in the first geographical area based on the first and second models.

10. The method of claim 8, further comprising:
presenting, on a map-related mobile application of a second user, information about a second POI in the first geographical area;
receiving input from the second user specifying a correction to an error in an individual attribute of the second POI in the first geographical area; and
generating a second field report that includes coordinates of the first geographical area, a timestamp, and an identifier of the individual attribute specified by the second user has having the error in the individual attribute.

11. The method of claim 10, further comprising aggregating a first field report with the second field report in response to determining that the second field report was generated within a same time interval as the first field report.

12. The method of claim 1, further comprising:
obtaining, from the plurality of records, place information;
based on the obtaining, generating a subset of records that include place information corresponds to the first geographical area; and
for each of the subset of records:
determining that an edit request is included for a given field corresponding to the first attribute;
accumulating a value representing a quantity of corrections to the first attribute in response to determining that the edit request is included for the given field corresponding to the first attribute; and
accumulating a value representing effort during the particular time period.

13. The method of claim 1, further comprising generating the first model after collecting multiple field reports for an individual attribute and the first geographical area across multiple time intervals.

14. A system comprising:
at least one processor configured to perform operations comprising:
identifying a plurality of corrections to a first attribute in a plurality of records for a particular time period;
based on identifying the plurality of corrections to the first attribute, generating information indicating a quantity of the plurality of corrections to the first attribute;
generating a first model that predicts accuracy of the first attribute in a first geographical area based on the generated information; and
in response to the first model determining that the first geographical area is associated with a threshold level of accuracy, presenting a visual indicator of a specified level of confidence in the first geographical area by a map-related application.

15. The system of claim 14, wherein the operations further comprise:
predicting by the first model a total number of errors associated with the first attribute.

16. The system of claim 14, wherein the operations further comprise:
accumulating a value based on the plurality of records; and
dividing a quantity of a plurality of corrections by the value to compute a first metric.

17. The system of claim 16, wherein the operations further comprise:
identifying a second metric representing a second quantity of corrections to the first attribute during a second time period; and
accumulating a second value representing a total number of errors across another plurality of time periods up to and including the second time period.

18. The system of claim 17, wherein the operations further comprise linearly regressing the first metric, the value, the second metric and the second value to generate the first model.

19. The system of claim 14, wherein the operations further comprise:
presenting, on a map-related mobile application of a first user, information about a point of interest (POI) in the first geographical area;
receiving input from the first user specifying a correction to an error in an individual attribute of the POI in the first geographical area; and
generating a first field report that includes coordinates of the first geographical area, a timestamp, and an identifier of the individual attribute specified by the first user has having the error in the individual attribute.

20. A non-transitory machine-readable storage medium that includes instructions that, when executed by one or more processors of a machine, cause the machine to perform operations comprising:
identifying a plurality of corrections to a first attribute in a plurality of records for a particular time period;
based on identifying the plurality of corrections to the first attribute, generating information indicating a quantity of the plurality of corrections to the first attribute;
generating a first model that predicts accuracy of the first attribute in a first geographical area based on the generated information; and
in response to the first model determining that the first geographical area is associated with a threshold level of accuracy, presenting a visual indicator of a specified level of confidence in the first geographical area by a map-related application.

* * * * *

UNITED STATES PATENT AND TRADEMARK OFFICE
CERTIFICATE OF CORRECTION

PATENT NO. : 12,353,398 B2  
APPLICATION NO. : 18/510195  
DATED : July 8, 2025  
INVENTOR(S) : Christopher Shughrue Page 1 of 1

It is certified that error appears in the above-identified patent and that said Letters Patent is hereby corrected as shown below:

In the Claims

In Column 33, Lines 57-58, in Claim 1, after "attribute", delete "in the first geographical area in"

Signed and Sealed this  
Third Day of February, 2026

John A. Squires  
*Director of the United States Patent and Trademark Office*